(12) United States Patent
Bhogal et al.

(10) Patent No.: US 8,825,029 B2
(45) Date of Patent: **\*Sep. 2, 2014**

(54) CALL-IN NUMBER FORMATTING ADJUSTMENT PER VIEWING DEVICE

(75) Inventors: Kulvir S. Bhogal, Fort Worth, TX (US); Lisa Seacat DeLuca, San Francisco, CA (US); Lydia M. Do, Raleigh, NC (US)

(73) Assignee: International Business Machines Corporation, Armonk, NY (US)

( \* ) Notice: Subject to any disclaimer, the term of this patent is extended or adjusted under 35 U.S.C. 154(b) by 182 days.

This patent is subject to a terminal disclaimer.

(21) Appl. No.: 13/491,740

(22) Filed: Jun. 8, 2012

(65) Prior Publication Data

US 2013/0329871 A1 Dec. 12, 2013

Related U.S. Application Data

(63) Continuation of application No. 13/491,708, filed on Jun. 8, 2012.

(51) Int. Cl.
*H04M 3/42* (2006.01)
(52) U.S. Cl.
USPC ....... 455/416; 379/202.01; 370/260; 709/204
(58) Field of Classification Search
CPC .......................... H04M 3/563; H04L 12/1813
USPC ....... 379/202.01; 455/416; 370/260; 709/204
See application file for complete search history.

(56) References Cited

U.S. PATENT DOCUMENTS

| | | | |
|---|---|---|---|
| 5,241,589 A | 8/1993 | Jefferson | |
| 5,299,261 A | 3/1994 | Bogart et al. | |
| 6,289,226 B1 | 9/2001 | Lekven et al. | |
| 7,162,025 B2 | 1/2007 | Schnurr | |
| 7,555,316 B2 | 6/2009 | Diedrich et al. | |
| 7,835,504 B1 | 11/2010 | Donald et al. | |
| 7,852,997 B2 | 12/2010 | Fowler et al. | |
| 8,094,805 B2 | 1/2012 | Dai | |
| 2009/0144068 A1 | 6/2009 | Altberg et al. | |
| 2010/0208625 A1 | 8/2010 | Logan et al. | |
| 2011/0116613 A1 | 5/2011 | Ahlin | |
| 2011/0286591 A1 | 11/2011 | Fulton et al. | |
| 2012/0076286 A1 | 3/2012 | Yie et al. | |
| 2013/0064359 A1 | 3/2013 | Kalmstrom | |

OTHER PUBLICATIONS http://www.tech-recipes.com/rx/2495/iphone_insert_dialing_pause_into_contact_phone_numbers/iPhone: Insert dialing pause into contact phone numbers, pp. 1-6, Jun. 8, 2012.
U.S. Appl. No. 13/491,708, filed Jun. 8, 2012, Notice of Allowance Communication, Jan. 6, 2014, 10 pages.

*Primary Examiner* — Creighton Smith
(74) *Attorney, Agent, or Firm* — Gibb & Riley, LLC

(57) ABSTRACT

Systems and methods for initiating a telephone call on a communication device receive, into a computerized device, an instruction to connect a communication device to a communication receiver using a call-in string comprising a call-in number and a pass code. The call-in string is parsed to separate the call-in number and the pass code, using the computerized device. A pause indicator is identified in the call-in string, using the computerized device. The pause indicator is formatted to a type-specific format appropriate for the type of communication device, using the computerized device. The call-in number is transmitted from the computerized device to the communication receiver. A pause is executed, using the computerized device, according to the pause indicator formatted for a specific type of device. The pass code is transmitted from the computerized device to the communication receiver.

25 Claims, 12 Drawing Sheets

Toll Free: 800-123-4567
Toll: 543-321-6543
Pass Code: 5555
BlackBerry: 800-123-4567x5555#
iPhone: 800-123-4567,,,5555#
Android: 800-123-4567…5555#
regular: 800-123-4567ppp5555#

Toll Free: 800-123-4567
Toll: 543-321-6543
Pass Code: 5555
BlackBerry: 800-123-4567x5555#
iPhone: 800-123-4567,,,5555#
Android: 800-123-4567....5555#
regular: 800-123-4567ppp5555#

FIG 1

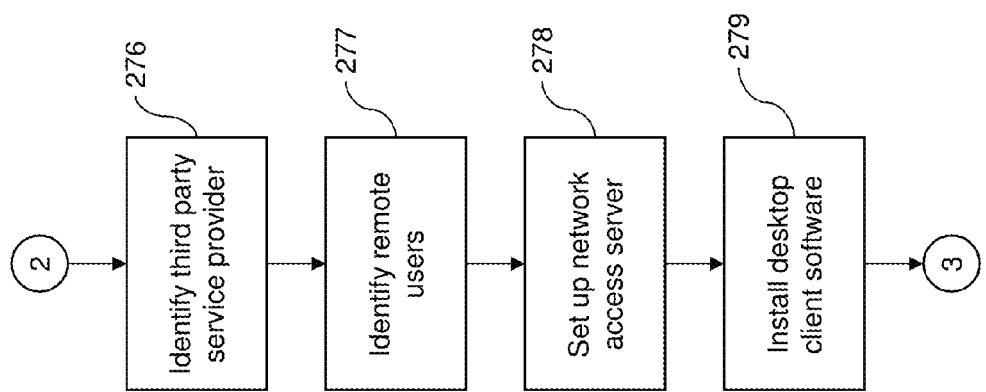

CALL-IN NUMBER FORMATTING ADJUSTMENT PER VIEWING DEVICE

CROSS-REFERENCE TO RELATED APPLICATIONS

The present invention claims the benefit under 35 U.S.C. §120 as a continuation of presently pending U.S. patent application Ser. No. 13/491,708, filed on Jun. 8, 2012, the entire teachings of which are incorporated herein by reference.

BACKGROUND

The present disclosure relates to communication devices, and more specifically, to a system and method to adjust the format of a call-in number according to the type of communication device.

Conventional technologies provide that a user may receive an invitation to join a conference call by means of an email or calendar invitation. The invitation typically includes a call-in number and a pass code, both of which are necessary for access to the conference call. Phone systems generally require the call-in number and pass code to be entered separately. In most cases, the user must pause between entry of the call-in number and the pass code into the user's phone. With the widespread use of Smartphones, a user may be able to enter the call-in number and the pass code by selecting them from the email invitation or calendar entry on the Smartphone. For example, if a user wants to call a call-in number directly from a calendar/meeting invite they can click on the number and their device will connect the call. However, if the device does not understand the pause symbol, the device will not enter the remaining characters. FIG. 1 shows an example of call-in instructions for a meeting, including a pass code associated with the meeting. The number 1-800-123-4567 pppp5555 means to pause for 4 seconds after the call-in number and then send the sequence 5555. Unfortunately, each type of device uses a different symbol to indicate a pause. A meeting organizer can resolve this problem by manually entering on the meeting invite all of the alternatives for every device type, as shown in FIG. 1. This does not necessarily solve the problem, however, because the options for the pause indicator might change over time and a user might accidentally click on the wrong link such that the pause will not work requiring the user to lookup the pass code and manually enter it.

SUMMARY

According to one embodiment herein, a method is disclosed. The method comprises receiving, into a computerized device, an instruction to connect a communication device to a communication receiver using a call-in string comprising a call-in number and a pass code. The call-in string is parsed to separate the call-in number and the pass code, using the computerized device. A pause indicator is identified in the call-in string, using the computerized device. The pause indicator is formatted to a type-specific format appropriate for the type of communication device, using the computerized device. The call-in number is transmitted from the computerized device to the communication receiver. A pause is executed, using the computerized device, according to the pause indicator formatted for a specific type of device. The pass code is transmitted from the computerized device to the communication receiver.

According to another embodiment herein, a method of initiating a telephone call on a communication device is disclosed. The method comprises recognizing, by the communication device, as a telephone number, a first string of characters in a collection of characters displayed on a display of the communication device. The method further comprises recognizing, by the communication device, as additional information related to the telephone number, a second string of characters in the collection of characters displayed on the display, the second string of characters comprising at least a pass code. The method further comprises recognizing, by the communication device, a pause indicator in the collection of characters displayed on the display. The pause indicator is formatted to a type-specific format appropriate for use by the communication device, using the communications device. Responsive to instructions from a user, the first string of characters, the second string of characters, and the pause indicator formatted for a specific type of communication device are provided to a telephone calling application of the communication device, using the communications device.

According to another embodiment herein, another method is disclosed. The method comprises receiving from a user, into a computerized device, a call control symbol sequence for establishing a call; the call control symbol sequence includes a plurality of symbol strings, at least one of the symbol strings comprising a pause indicator. The received symbol sequence is parsed to identify the at least one symbol string comprising the pause indicator, using the computerized device. The pause indicator is formatted, as necessary, to a type-specific format appropriate for a type of communication device receiving the call control symbol sequence, using the computerized device. In response to the receipt of the call control symbol sequence and after formatting the pause indicator, the call is established according to the call control symbol sequence.

According to another embodiment herein, a communication device is disclosed. The device comprises a telephone device and a processor operatively connected to the telephone device. The processor executes an application to receive an instruction to connect the communication device to a communication network using a call-in string comprising a call-in number and a pass code. The processor parses the call-in string to separate the call-in number and the pass code. The processor identifies a pause indicator in the call-in string. The processor formats the pause indicator to a type-specific format appropriate for the communication device. The telephone device transmits the call-in number to a communication receiver. The telephone device executes a pause according to the pause indicator formatted for a specific type of communication device. The telephone device transmits the pass code to the communication receiver.

According to another embodiment herein, a communication device is disclosed. The device comprises a display device and a processor operatively connected to the display device. The processor executes an application to recognize, as a telephone number, a first string of characters in a collection of characters displayed on the display of the communication device. The processor recognizes, as additional information related to the telephone number, a second string of characters in the collection of characters and displayed on the display, the second string of characters comprises a pause indicator and a pass code. The processor recognizes a pause indicator in the collection of characters displayed on the display device. The processor formats the pause indicator to a type-specific format appropriate for use by the communication device. The first string of characters, the second string of characters, and the pause indicator formatted for a specific type of communication device are provided to a telephone calling application of the communication device, when a user has selected to execute a call.

According to another embodiment herein, a non-transitory computer readable storage medium is disclosed. The storage medium is readable by a computerized device. The non-transitory computer readable storage medium stores instructions executable by the computerized device to perform a method. The method includes receiving from a user a call control symbol sequence for establishing a call. The call control symbol sequence includes a plurality of symbol strings, at least one of the symbol strings comprising a pause indicator. The method further includes parsing the received symbol sequence to identify the at least one of the symbol strings comprising the pause indicator. The pause indicator is formatted, as necessary, to a type-specific format appropriate for a type of communication device receiving the call control symbol sequence. In response to the receipt of the call control symbol sequence and after formatting the pause indicator, the call is established according to the call control symbol sequence.

BRIEF DESCRIPTION OF THE DRAWINGS

The embodiments herein will be better understood from the following detailed description with reference to the drawings, which are not necessarily drawn to scale and in which:

FIG. 1 is an example of a conference call invitation according to embodiments herein;

FIG. 12 is a schematic diagram of a virtual private network system according to embodiments herein.

DETAILED DESCRIPTION

Described below is a method that modifies a telephone number that includes pauses. The telephone number is modified based on the type of device accessing the number. A Smartphone calendaring system includes an input for an upcoming meeting that requires a phone number and a pass code. The calendaring system determines the type of device attempting to access the call-in number and pass code. Accessing the call-in number comprises the pause indicator symbol being parsed using known string manipulation techniques. Each pause indicator symbol is then replaced with the pause indicator specific to the type of device accessing the call-in number (e.g. "p"—regular phone, "x"—blackberry, etc.). That is, the pause indicator is modified for a specific format based on the type of device. Once the formatting is complete, the user may then interact with the number by clicking a link to dial. The device interprets the pauses correctly, and the user is connected to the call.

In a similar fashion, the phone number and pass code may be delivered to a user by email or text, such as a short message service (SMS) or multimedia messaging service (MMS). The email or texting system determines the type of device attempting to access the call-in number and pass code. Using known string manipulation techniques, the pause indicator symbol is parsed from the call-in number. Each pause indicator symbol is then replaced with the pause indicator specific to the type of device accessing the call-in number (e.g. "p"—regular phone, "x"—blackberry, etc.). That is, the pause indicator is modified for a specific format based on the type of device. Once the formatting is complete, the user may then interact with the number by clicking a link to dial. The device interprets the pauses correctly, and the user is connected to the call.

In some cases, a pause is not present, but implied. For example, in the number 18001234567×5555, the "x" may not indicate a pause. The "x" may merely indicate that the next set of characters (5555) is a pass code. Alternatively, some messaging/calendaring systems have a separate input field for the pass code. Typically, in all of these situations one (or more) pauses can be added. According to embodiments herein, the correct pause character can be sent based on the device dialing the number.

Modern browsers can use the user-agent string to determine the type of device making the request to the browser. Using this information a developer of a web application can intentionally format the information such that it is displayed differently on each of the different devices. The formatting is not done on the content itself but rather on the styling of the display.

Figure 2:
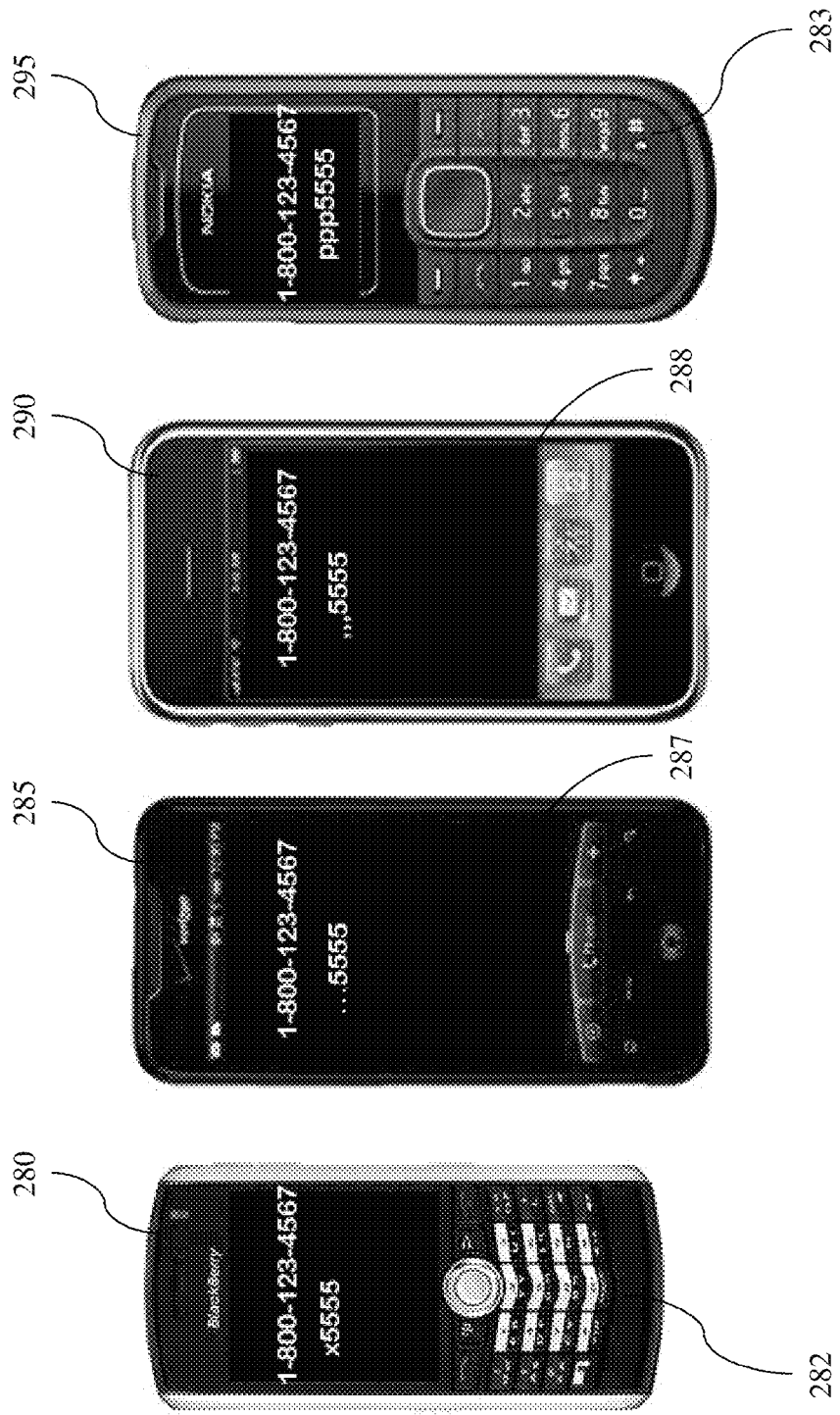
FIG. 2 is an illustration of Smartphones according to embodiments herein.

FIG. 2 shows a variety of Smartphones, each having a different symbol to indicate a pause or break in transmission of a telephone number. A BlackBerry phone 280 (available from Research in Motion, Waterloo, Ontario, Canada) may use an 'x'. An Android type phone 285 (such as available from HTC Corporation, Taoyuan City, Taiwan) may use a '.'. An iPhone 290 (available from Apple, Inc., Cupertino, Calif., USA) may use a ','. A regular type phone 295 may use a 'p'. Disclosed is a system and method to modify a telephone number that includes pauses based on the type of device access the number; for example, on an iPhone 290, show 18001234567,,,5555, on an Android phone 285: . . . 5555, on a regular phone 295: ppp5555, and on a BlackBerry phone 280: x5555.

1. The calendaring system includes an input for an upcoming meeting that requires a phone number and pass code.
2. The calendar system determines the type of device attempting to access the call-in number.
3. The pause indicator symbol is parsed from the call-in number using known string manipulation techniques.
4. Each pause indicator symbol is then replaced with a pause indicator specific to the type of device accessing the call-in number.
    a) regular 295—'p'
    b) iPhone 290—','
    c) Android 285—'.'
    d) BlackBerry 280—'x'
5. The user may then interact with the number shown in the calendaring system by clicking a link to dial.
6. The device interprets the pauses correctly and the user is connected.

Alternatively, rather than the numbers being changed within the viewable calendar/meeting invite, the numbers could be modified by the device when the user clicks to dial any of the call-in numbers, at which time the same steps of parsing the pause indicator symbol and replacing with the device specific pause indicator is performed before completing the call request.

Different participants for a conference call access the meeting invite from different devices. Each participant views the conference dial in information specific to his or her phone device.

Figure 3:
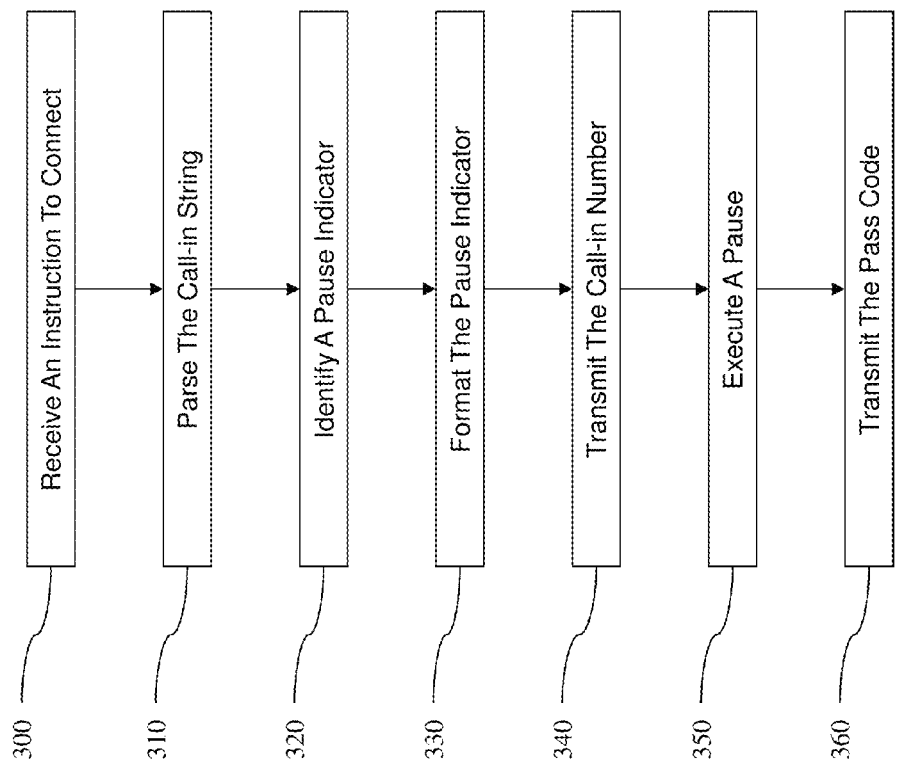
FIG. 3 is a flow diagram illustrating embodiments herein.

Referring to FIG. 3, a flow chart illustrating a method according to one embodiment herein is shown. The process of FIG. 3 may be executed by a computerized device. At 300, an instruction to connect a communication device to a communication receiver is received. The instruction is received into the computerized device and directs the communication device to connect to the communication receiver using a call-in string. The call-in string includes a call-in number and a pass code. At 310, the call-in string is parsed by the computerized device to separate the call-in number and the pass code. At 320, the computerized device identifies a pause indicator in the call-in string. Then, at 330, the computerized device formats the pause indicator to a type-specific format appropriate for the communication device. Once the pause indicator has been formatted to a type-specific format appropriate for the communication device, the call-in number is transmitted from the computerized device to the communication receiver 340. The computerized device then executes a pause 350 according to the pause indicator formatted for a specific type of communication device. At 360, after the pause, the pass code is transmitted from the computerized device to the communication receiver.

Figure 4:
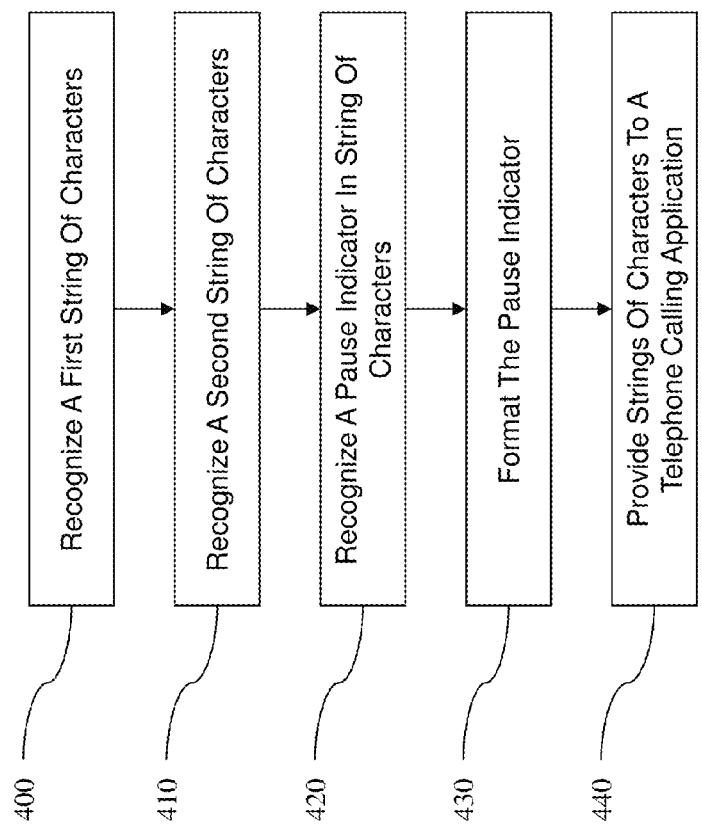
FIG. 4 is a flow diagram illustrating embodiments herein.

FIG. 4 illustrates a method according to another embodiment herein. The method illustrated in FIG. 4 begins at 400 where a first string of characters in a collection of characters displayed on a display of the communication device is recognized as a telephone number. At 410, a second string of characters in the collection of characters displayed on the display is recognized as additional information related to the telephone number. The second string of characters includes at least a pass code. At 420, a pause indicator is recognized in the collection of characters displayed on the display. Then, at 430, the pause indicator is formatted to a type-specific format appropriate for use by the communication device. Finally, at 440, and responsive to instructions from a user, the first string of characters, the second string of characters, and the pause indicator formatted for a specific type of communication device are provided to a telephone calling application of the communication device.

Figure 5:
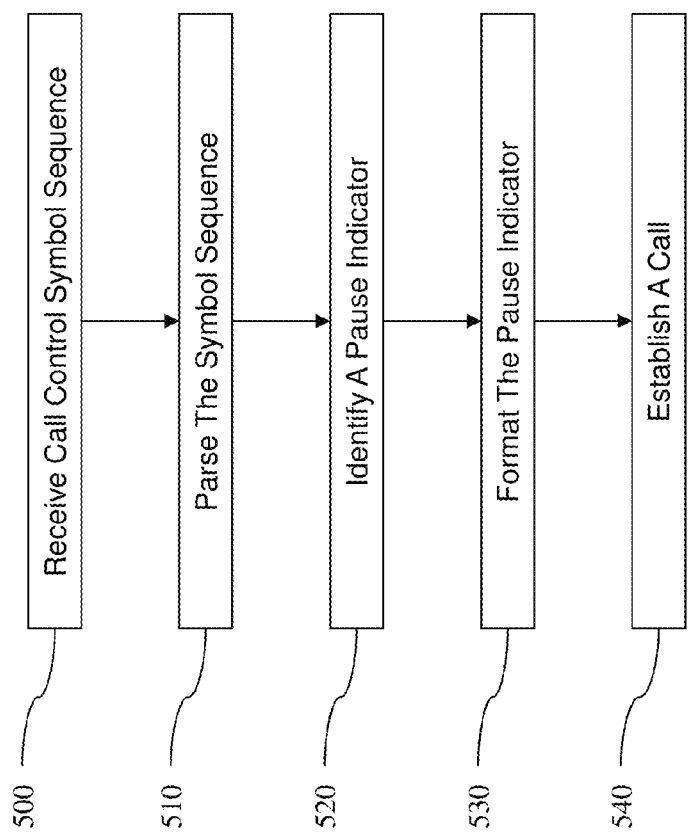
FIG. 5 is a flow diagram illustrating embodiments herein.

FIG. 5 illustrates a method according to another embodiment herein. According to the method disclosed, a call control symbol sequence for establishing a call is received from a user, into a computerized device 500. The call control symbol sequence includes a plurality of symbol strings; at least one of the symbol strings comprises a pause indicator. At 510, the received symbol sequence is parsed to identify at 520 the at least one symbol string comprising the pause indicator. Then, at 530, the pause indicator is formatted, as necessary, to a type-specific format appropriate for a type of communication device receiving the call control symbol sequence. Finally, at 540, and in response to the receipt of the call control symbol sequence and after formatting the pause indicator, a call is established according to the call control symbol sequence.

As shown in FIG. 2, each communication device, such as a BlackBerry 280, Android 285, iPhone 290, or regular type phone 295 includes a telephone device, such as 282, 283, and a processor operatively connected to the telephone device. According to an embodiment herein, the processor executes an application to receive an instruction to connect the communication device to a communication network. The instruction may come from a calendar or messaging application and directs the communication device using a call-in string. The call-in string comprises a call-in number and a pass code. The processor can parse the call-in string to separate the call-in number and the pass code. The processor can then identify a pause indicator in the call-in string. Each communication device may have a different symbol to indicate a pause or break in transmission of the call-in number. The processor formats the pause indicator to a type-specific format appropriate for the type of communication device. The telephone device 282, 283 can transmit the call-in number to a communication receiver. A pause according to the pause indicator formatted for the specific type of communication device is executed. Then the telephone transmits the pass code to the communication receiver.

As shown in FIG. 2, each communication device comprises a display device, such as 287, 288, and a processor operatively connected to the display device. The processor executes an application to recognize the characters displayed on the display device 287, 288. The first string of characters in the collection of characters displayed on the display of the communication device is recognized as a telephone number, 1-800-123-4567. The second string of characters in the collection of characters and displayed on the display is recognized as additional information related to the telephone number: . . . 5555 or ,,,5555. According to embodiments herein, the second string of characters comprises a pause indicator and a pass code. The processor recognizes a pause indicator in the collection of characters displayed on the display device. Each communication device may have a different symbol to indicate a pause or break for transmission of the telephone number. The processor formats the pause indicator to a type-specific format appropriate for use by the communication device. When a user has selected to execute a call, the processor provides the first string of characters to a telephone calling application of the communication device. Then, the processor provides the pause indicator formatted for the specific type of communication device. Finally, the processor provides the second string of characters, which includes the pass code.

According to another embodiment herein, a non-transitory computer readable storage medium is disclosed. The storage medium is readable by a computerized device. The non-transitory computer readable storage medium stores instructions executable by the computerized device to perform a method. The method includes receiving from a user a call control symbol sequence for establishing a call. The call control symbol sequence includes a plurality of symbol strings; at least one of the symbol strings comprises a pause indicator. The received symbol sequence is parsed to identify the at least one of the symbol strings comprising the pause indicator. The pause indicator is formatted, as necessary, to a type-specific format appropriate for a type of communication device receiving the call control symbol sequence. In response to the receipt of the call control symbol sequence and after formatting the pause indicator, the call is established according to the call control symbol sequence.

As will be appreciated by one skilled in the art, aspects of the systems and methods herein may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Figure 6:
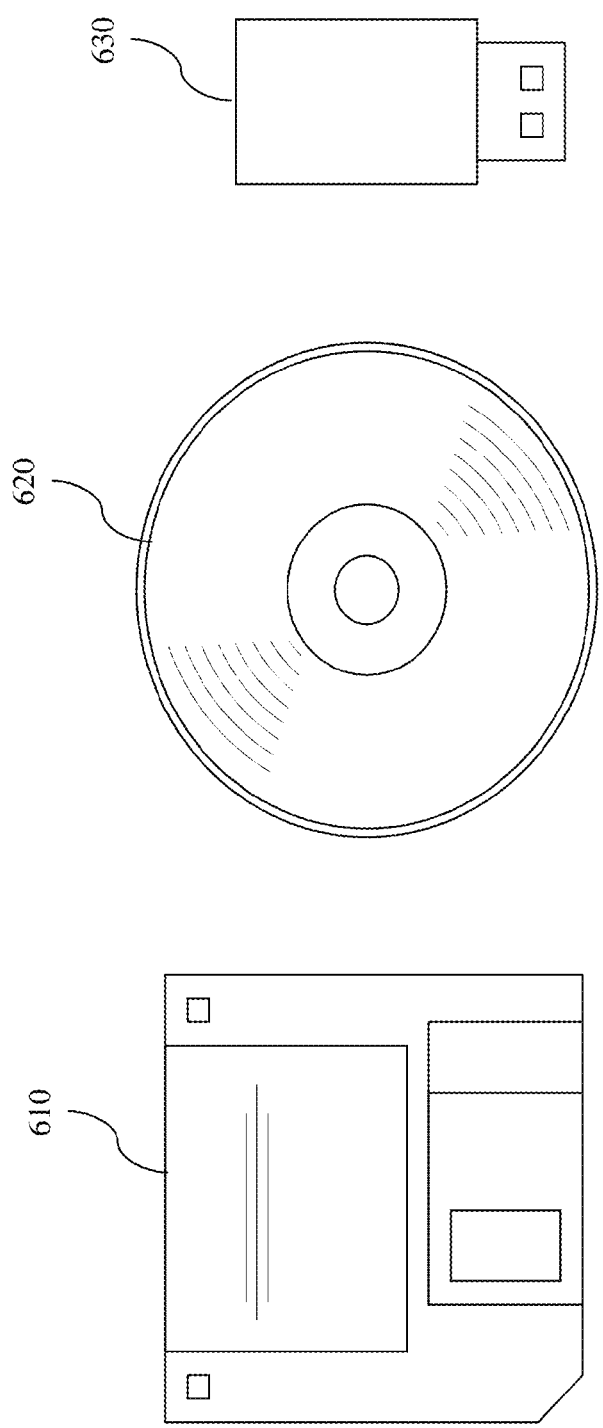
FIG. 6 is representative illustrations of computer-readable medium for carrying out the present invention.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) 620 (FIG. 6), an optical storage device, a magnetic storage device 610, a "plug-and-play" memory device 630, like a USB flash drive, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments herein. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
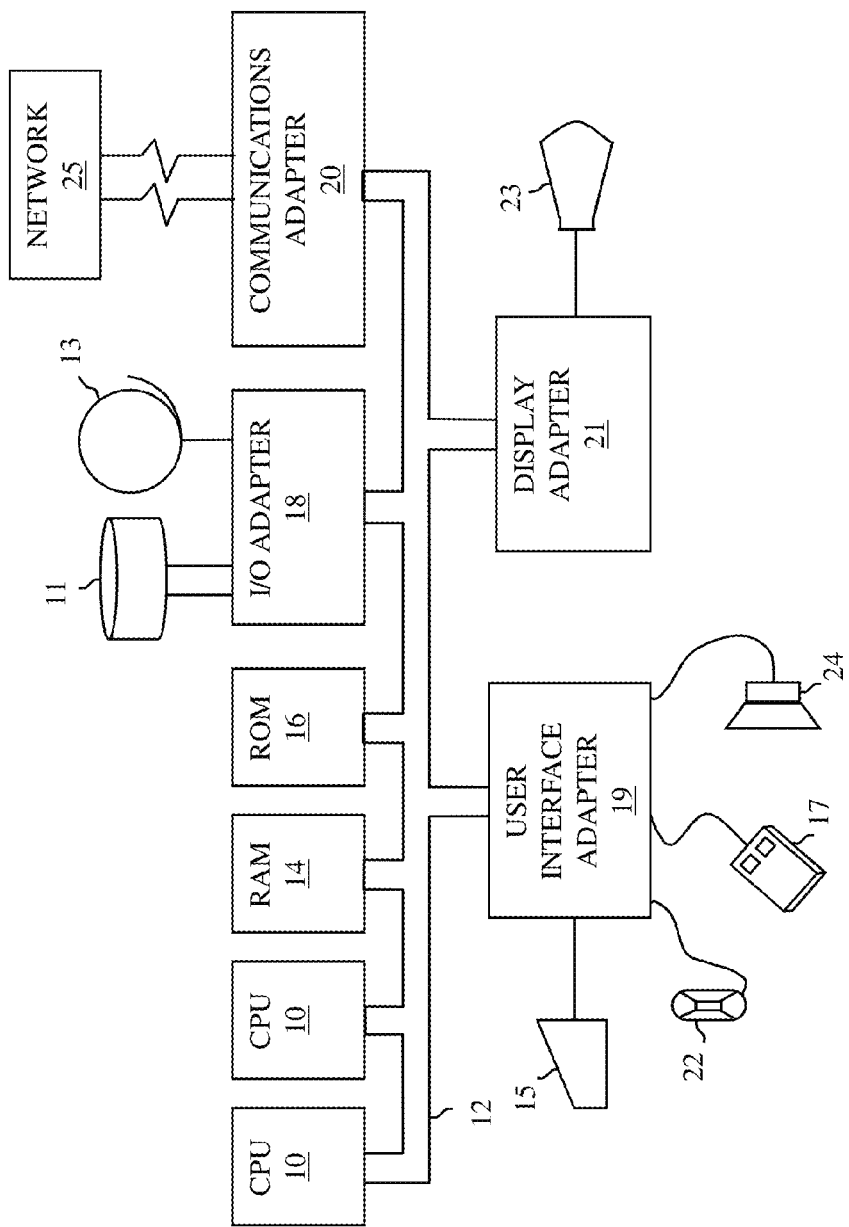
FIG. 7 is a schematic diagram of a hardware system according to embodiments herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which may be embodied as an output device such as a monitor, printer, or transmitter, for example.

The flowchart and block diagrams in the figures illustrate the architecture, functionality, and operation of possible implementations of systems, methods, and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server, and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Alternatively, the process software is sent directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

Figure 8:
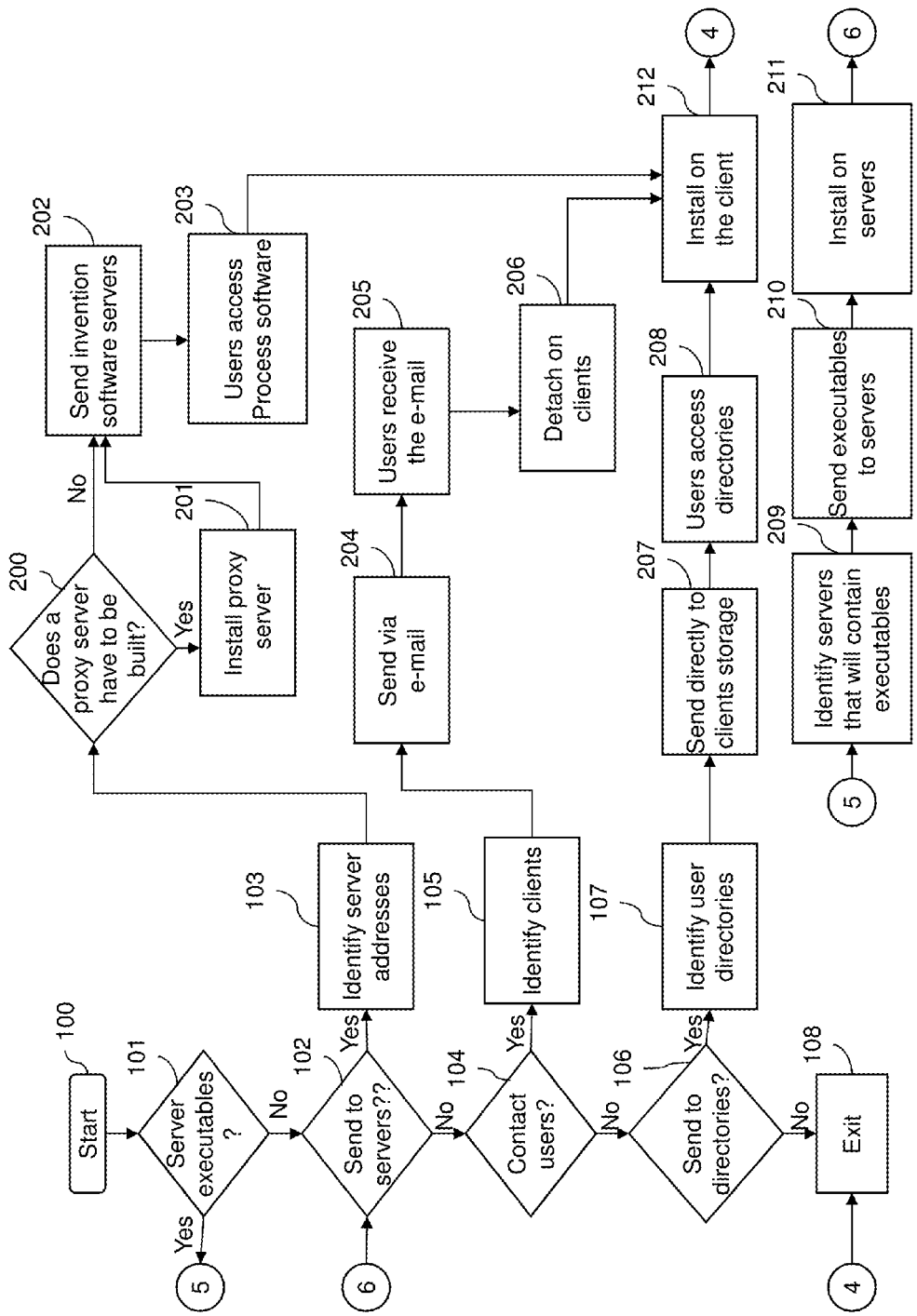
FIG. 8 is a schematic diagram of a deployment system according to embodiments herein.

In FIG. 8, Step 100 begins the deployment of the process software. The first thing is to determine if there are any programs that will reside on a server or servers when the process software is executed 101. If this is the case, then the servers that will contain the executables are identified 209. The process software for the server or servers is transferred directly to the servers' storage via FTP or some other protocol, or by copying through the use of a shared file system 210. The process software is then installed on the servers 211.

Next, a determination is made on whether the process software is to be deployed by having users access the process software on a server or servers 102. If the users are to access the process software on servers, then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212, and then exits the process 108.

In step 104, a determination is made whether the process software is to be deployed by sending the process software to users via e-mail. The set of users where the process software will be deployed are identified together with the addresses of the user client computers 105. The process software is sent via e-mail 204 to each of the users' client computers. The users then receive the e-mail 205 and then detach the process software from the e-mail to a directory on their client computers 206. The user executes the program that installs the process software on his client computer 212, and then exits the process 108.

Lastly, a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212, and then exits the process 108.

The process software is integrated into a client, server, and network environment by providing for the process software to coexist with applications, operating systems, and network operating systems software, and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely, parameters passed by the software applications to the process software will be checked to ensure the parameters match the parameters required by the process software. The client and server operating systems including the network operating systems will be identified and compared to the list of operating systems, version numbers, and network software that have been tested to work with the process software. Those operating systems, version numbers, and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 9:
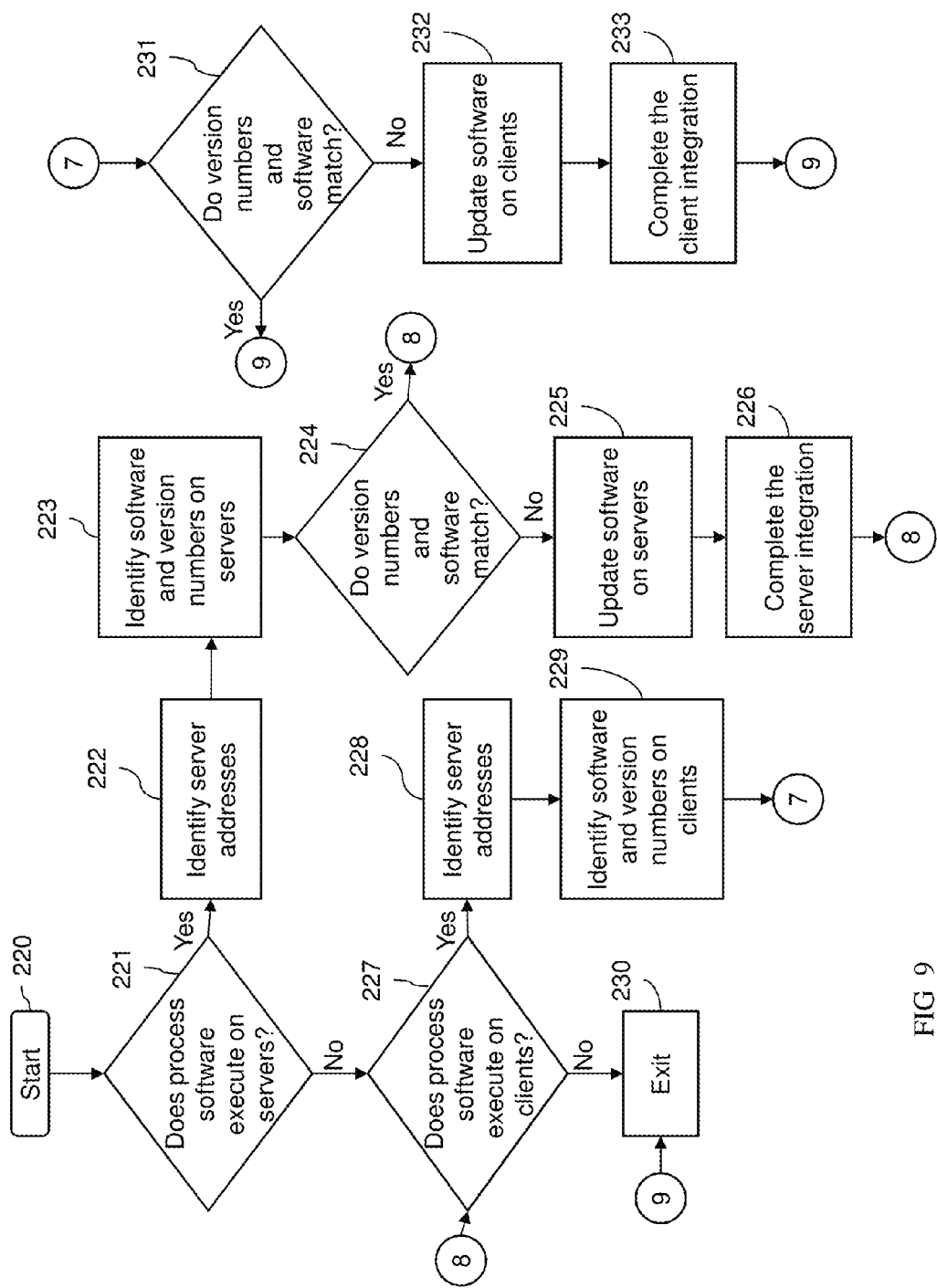
FIG. 9 is a schematic diagram of an integration system according to embodiments herein.

In FIG. 9, Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications, and NOS that have been tested with the process software 224. If all of the versions match and there is no missing required software, the integration continues in 227.

If one or more of the version numbers do not match, then the unmatched versions are updated on the server or servers with the correct versions 225. Additionally, if there is missing required software, then it is updated on the server or servers 225. The server integration is completed by installing the process software 226.

Step 227, which follows either step 221, 224, or 226, determines if there are any programs of the process software that will execute on the clients. If no process software programs execute on the clients, the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229. The clients are also checked to determine if there is any missing software that is required by the process software 229.

A determination is made as to whether the version numbers match the version numbers of OS, applications, and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer, which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer, which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 10:
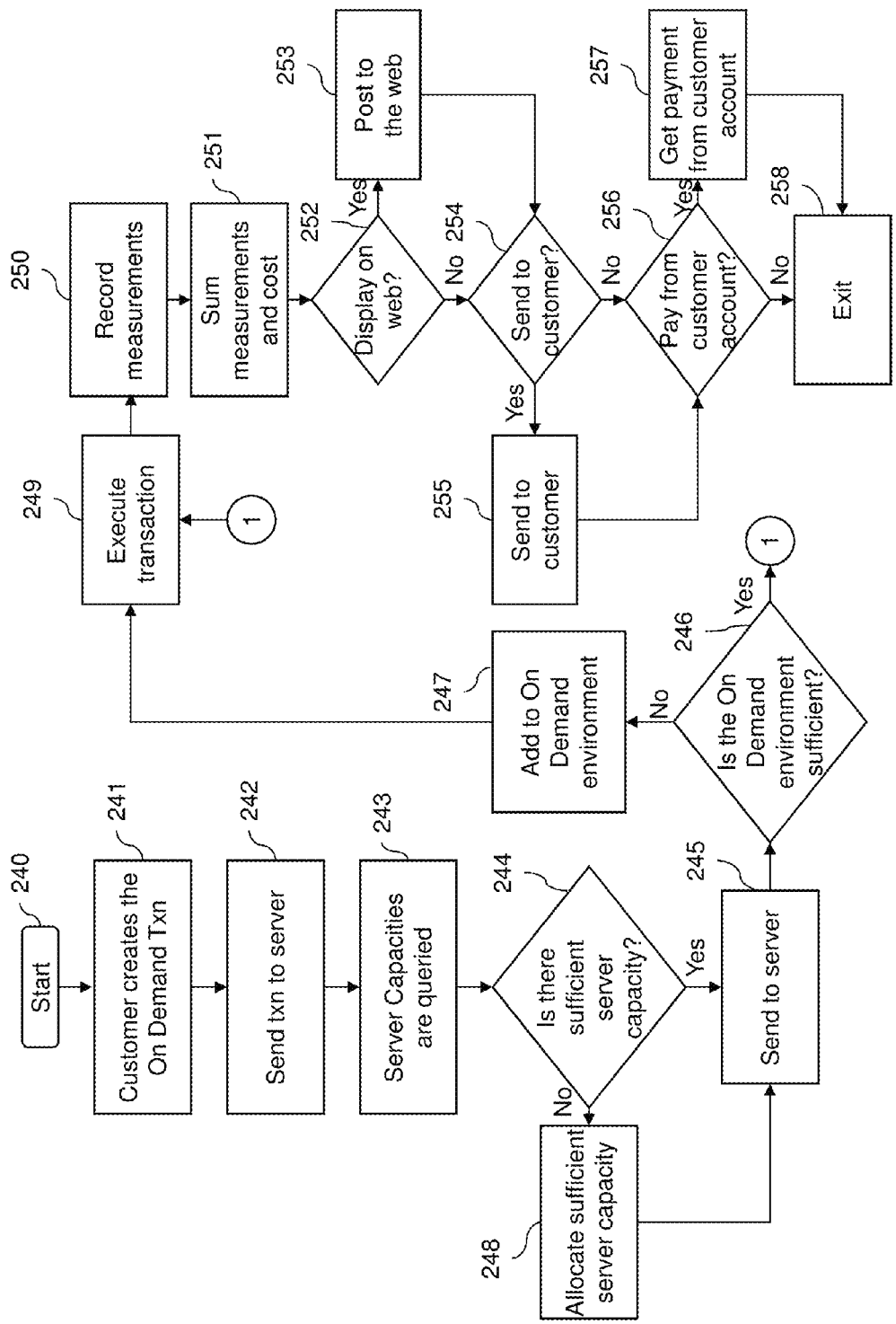
FIG. 10 is a schematic diagram of an on demand system according to embodiments herein.

In FIG. 10, Step 240 begins the On Demand process. A transaction is created that contains the unique customer identification, the requested service type, and any service parameters that further specify the type of service 241. The transaction is then sent to the main server 242. In an On Demand environment, the main server can initially be the only server, then, as capacity is consumed, other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU capacity available in any server to process the transaction 244. If there is not sufficient server CPU capacity available, then additional server CPU capacity is allocated to process the transaction 248. If there was already sufficient CPU capacity available, then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next, the required software to process the transaction is accessed, loaded into memory, then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer 251. If the customer has requested that the On Demand costs be posted to a web site 252, then they are posted 253.

If the customer has requested that the On Demand costs be sent via e-mail to a customer address 254, then they are sent 255. If the customer has requested that the On Demand costs be paid directly from a customer account 256, then payment is received directly from the customer account 257. The last step is to exit the On Demand process 258.

The process software may be deployed, accessed, and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed, and executed through either a remote-access or a site-to-site VPN. When using the remote-access VPNs, the process software is deployed, accessed, and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download, and execute the process software.

When using the site-to-site VPN, the process software is deployed, accessed, and executed through the use of dedicated equipment and large-scale encryption, which are used to connect a company's multiple fixed sites over a public network, such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

Figure 11:
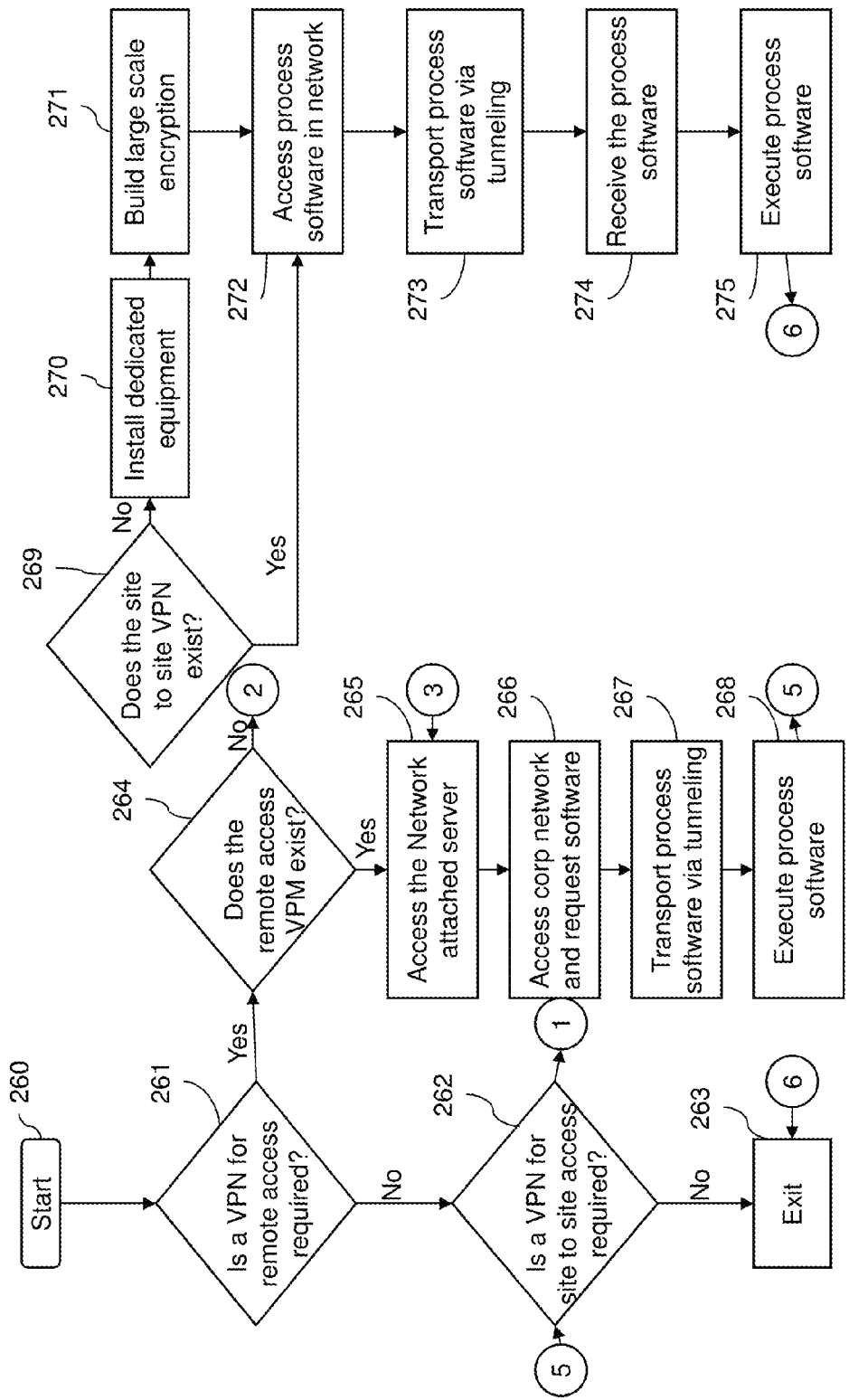
FIG. 11 is a schematic diagram of a virtual private network system according to embodiments herein.

In FIGS. 11 and 12, step 260 begins the Virtual Private Network (VPN) process. A determination is made to see if a VPN for remote access is required 261. If it is not required, then proceed to 262. If it is required, then determine if the remote access VPN exists 264.

If it does exist, then proceed to 265. Otherwise, identify the third party provider that will provide the secure, encrypted connections between the company's private network and the company's remote users 276. The company's remote users are identified 277. The third party provider then sets up a network access server (NAS) 278 that allows the remote users to dial a toll-free number or attach directly via a cable or DSL modem to access, download, and install the desktop client software for the remote-access VPN 279.

After the remote access VPN has been built, or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is, the process software is divided into packets and each packet, including the data and protocol, is placed within another packet 267. When the process software arrives at the remote user's desktop, it is removed from the packets, reconstituted, and executed on the remote users desktop 268.

A determination is made to see if a VPN for site-to-site access is required 262. If it is not required, then proceed to exit the process 263. Otherwise, determine if the site-to-site VPN exists 269. If it does exist, then proceed to 272. Otherwise, install the dedicated equipment required to establish a site-to-site VPN 270. Then build the large scale encryption into the VPN 271.

After the site-to-site VPN has been built, or if it had been previously established, the users access the process software via the VPN 272. The process software is transported to the site users over the network via tunneling 273. That is, the process software is divided into packets and each packet, including the data and protocol, is placed within another packet 274. When the process software arrives at the remote user's desktop, it is removed from the packets, reconstituted, and executed on the site users desktop 275. Proceed to exit the process 263.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A communication device comprising:
a telephone device; and
a processor operatively connected to said telephone device that executes an application to:
   receive an instruction to connect said communication device to a communication network using a call-in string comprising a call-in number and a pass code;
   parse said call-in string to separate said call-in number and said pass code;
   identify a pause indicator in said call-in string;
   format said pause indicator to a type-specific format appropriate for said communication device;
   transmit said call-in number to a communication receiver by said telephone;
   execute a pause according to said pause indicator formatted for a specific type of communication device; and
   transmit said pass code to said communication receiver by said telephone.

2. The communication device of claim 1, said telephone device being selected from the group consisting of:
Smartphones;
tablets;
e-books; and
combinations of above devices.

3. The communication device of claim 1, said identifying a pause indicator in said call-in string comprising identifying at least one specific character indicating to said telephone device to delay transmitting any next string of characters.

4. The communication device of claim 1, said pause indicator directing said telephone device to transmit said pass code after a timed delay after transmitting said call-in number.

5. The communication device of claim 1, said formatting said pause indicator to a type-specific format appropriate for said communication device further comprising:
   said processor recognizing a type of communication device instructed to connect to said communication network; and
   said processor changing, as necessary, said pause indicator to a format appropriate for said type of communication device instructed to connect to said communication receiver.

6. The communication device of claim 1, said call-in string comprising a first string of characters and a second string of characters, said first string of characters comprising a telephone number and said second string of characters comprising said pause indicator and said pass code.

7. The communication device of claim 1, said call-in string being associated with a conference bridge and said pass code being associated with a particular conference call.

8. A device for initiating a telephone call comprising:
a display device;
a processor operatively connected to said display device, said processor executing a first application to:
   recognize, as a telephone number, a first string of characters in a collection of characters displayed on said display device;
   recognize, as additional information related to said telephone number, a second string of characters in said collection of characters displayed on said display device, said second string of characters comprising at least a pass code;
   recognize a pause indicator in said collection of characters displayed on said display device;
   format said pause indicator to a type-specific format appropriate for use by a communication device; and
   provide said first string of characters, said second string of characters, and said pause indicator formatted for a specific type of communication device to a telephone calling application of said communication device, when a user has selected to execute a call.

9. The device of claim 8, said device for initiating a telephone call being selected from the group consisting of:
Smartphones;
tablets;
e-books; and
combinations of above devices.

10. The device of claim 8, said recognizing a pause indicator in said collection of characters displayed on said display device comprising identifying at least one specific character indicating to said telephone calling application of said communication device to delay transmitting any next string of characters.

11. The device of claim 8, said pause indicator directing said telephone calling application to transmit said second string of characters after a timed delay after transmitting said first string of characters.

12. The device of claim 8, said formatting said pause indicator to a type-specific format appropriate for said communication device further comprising:
   said processor recognizing a type of communication device; and
   said processor changing, as necessary, said pause indicator to a format appropriate for said type of communication device.

13. The device of claim 8, said first string of characters comprising a telephone number and said second string of characters comprising said pause indicator and said pass code.

14. The device of claim 13, said telephone number being associated with a conference bridge and said pass code being associated with a particular conference call.

15. A telephone device comprising:
a display device;
a telephone calling application; and
a processor that executes an application to:
   recognize a first string of characters in a collection of characters displayed on at least a portion of said display device as a telephone number;
   recognize a second string of characters in said collection of characters displayed on at least a portion of said display device as additional information related to said telephone number;
   recognize a pause indicator in said collection of characters displayed on at least a portion of said display device;

parse said pause indicator from said collection of characters;

format said pause indicator to a type-specific format appropriate for use by said telephone calling application;

receive an instruction to connect said telephone device to a communication network using said first string of characters and said second string of characters;

transmit said first string of characters to a communication receiver by said telephone calling application;

execute a pause according to said pause indicator formatted for a specific type of telephone calling application; and transmit said second string of characters to said communication receiver by said telephone calling application.

16. The telephone device of claim 15, said recognizing a pause indicator in said collection of characters displayed on at least a portion of said display device comprising identifying at least one specific character indicating to said telephone calling application to delay transmitting any next string of characters.

17. The telephone device of claim 15, said pause indicator directing said telephone calling application to transmit said second string of characters after a timed delay after transmitting said call-in number.

18. The telephone device of claim 15, said formatting said pause indicator to a type-specific format appropriate for said telephone calling application further comprising:

said processor recognizing a type of device instructed to connect to said communication network; and said processor changing, as necessary, said pause indicator to a format appropriate for said type of device instructed to connect to said communication receiver.

19. The telephone device of claim 15, said first string of characters comprising a telephone number and said second string of characters comprising said pause indicator and a pass code.

20. A non-transitory computer readable storage medium readable by a computerized device, said non-transitory computer readable storage medium storing instructions executable by said computerized device to perform a method comprising:

receiving from a user a call control symbol sequence for establishing a call, said call control symbol sequence including a plurality of symbol strings, at least one of said symbol strings comprising a pause indicator;

parsing said call control symbol sequence to identify said at least one of said symbol strings comprising said pause indicator;

formatting said pause indicator, as necessary, to a type-specific format appropriate for a type of communication device receiving said call control symbol sequence; and in response to receipt of said call control symbol sequence and after said formatting said pause indicator, establishing said call according to said call control symbol sequence.

21. The non-transitory computer readable storage medium of claim 20, said parsing said call control symbol sequence to identify said at least one of said symbol strings comprising said pause indicator comprising:

recognizing said pause indicator in said call control symbol sequence comprising identifying at least one specific character indicating to said communication device to delay transmitting any next string of characters.

22. The non-transitory computer readable storage medium of claim 20, said formatting said pause indicator to a type-specific format appropriate for said type of communication device receiving said call control symbol sequence further comprising:

recognizing a type of said communication device; and changing, as necessary, said pause indicator to a format appropriate for said type of communication device.

23. The non-transitory computer readable storage medium of claim 20, said call control symbol sequence comprising a first string of characters and a second string of characters, said first string of characters comprising a telephone number and said second string of characters comprising a pass code.

24. The non-transitory computer readable storage medium of claim 23, said pause indicator directing a telephone calling application of said communication device to transmit said second string of characters after a timed delay after transmitting said first string of characters.

25. The non-transitory computer readable storage medium of claim 23, said telephone number being associated with a conference bridge and said pass code being associated with a particular conference call.

* * * * *